Dec. 17, 1929.  G. HEDEN  1,739,967
BUOYING AND DRIVING MECHANISM FOR FLYING MACHINES
Filed April 16, 1928
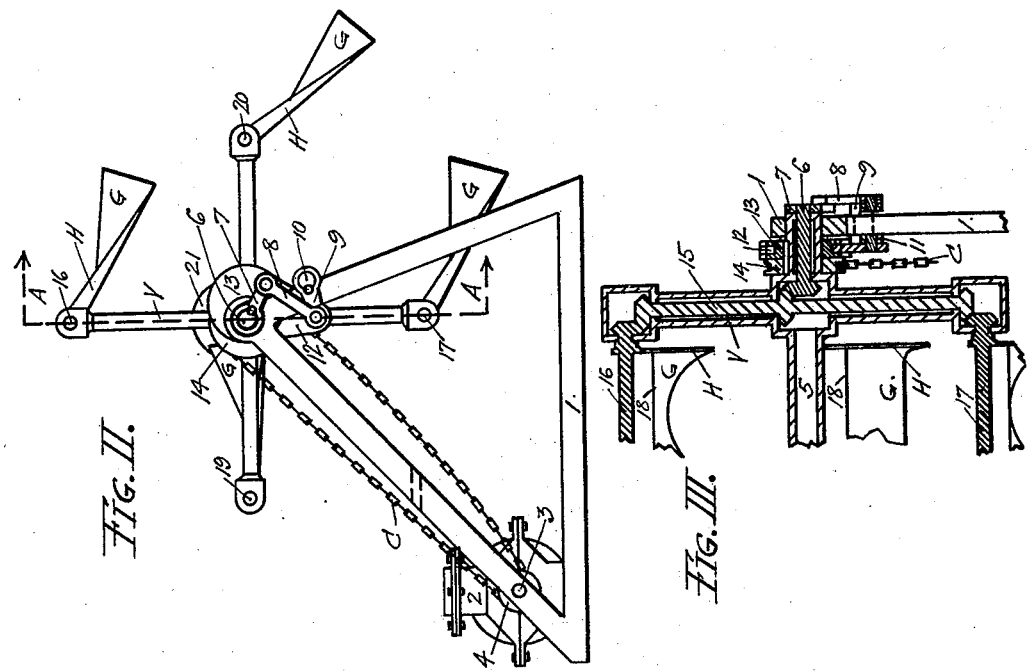
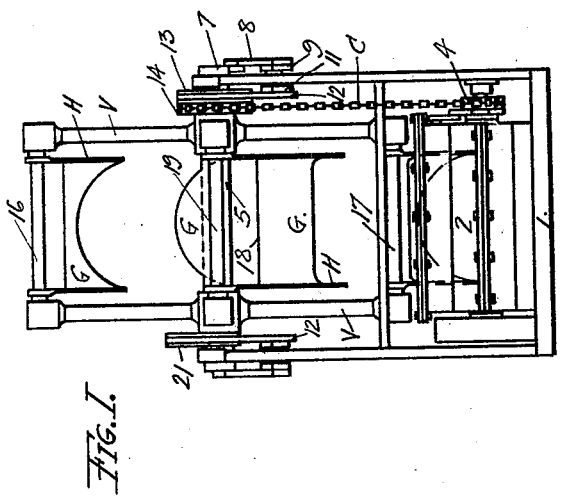
INVENTOR Patented Dec. 17, 1929

1,739,967

UNITED STATES PATENT OFFICE

GUSTAF HEDÉN, OF NEW YORK, N. Y.

BUOYING AND DRIVING MECHANISM FOR FLYING MACHINES

Application filed April 16, 1928. Serial No. 270,514.

This invention relates to improvements in flying machines and has for its object to provide a buoying and driving mechanism having wings carried in a rigid wing wheel by rotatable and oscillatable arms, fast on horizontal and parallel shafts, rotatably and oscillatably mounted between hollow parallel radial arms, fast on and forming a cross near each end of a hollow horizontal central shaft, said radial arms and central shaft forming a wing wheel which is rotated by sprocket and chain connection to motors, the diametrically opposite located pairs of said shafts being provided at one end with bevel gears which connect by common like bevel gear and rod connections to like bevel gears on outer central horizontal bevel gears and crank shafts, journaled in each end of the hollow central shaft of said wing wheel and operated by lower parallel crank arm shafts, oscillated by eccentrics, fast on said central shaft, and thus causing the wing arms to oscillate during their rotation.

Another object is to provide certain improvements in form, construction and arrangement of the different parts whereby the above and other objects may be effectively carried out.

A practical embodiment is represented in the accompanying drawings in which

Fig. 1 represents in front elevation a portion of a flying machine which includes my improved construction.

Fig. 2 represents a side elevation of the same.

Fig. 3 represents a laterally enlarged partial cross section at A—A.

The body of the machine, denoted by 1, and in which are mounted motors 2, provides one bearing for motor sprocket shaft 3 and two bearings at each side above, namely one for each of main shaft 5 and crank arm shaft 10.

The hollow main shaft 5 of the wing wheel V—5—V, on which shaft are fast the hollow radial arms V, sprocket 14 and the eccentric discs 13 and 21, provides bearings within at each end for bevel gear and crank shafts 6, the bevel gear of which at one end of said central shaft 5 connects by common like bevel gear and rod drive 15 in the hollow radial arms V to like bevel gears fast on one end of wing arm shafts 16 and 17, and the bevel gear of which at other end of shaft 5 connects by a similar common like bevel gear and rod drive in the hollow radial arms V at other end of wheel to like bevel gears, fast on one end of wing arm shafts 19 and 20.

Wing arm shafts 16 and 17 are operated by eccentric disc 13 and wing arm shafts 19 and 20 by eccentric disc 21.

Both eccentric discs 13 and 21 are set on shaft 5 at 90 degree angle to the hollow radial arms V in which are located the common like bevel gear and rod drives which they operate.

On wing arm shafts 16, 17, 19 and 20 are fast wing arms H which may be provided with springs at their outer ends for the purpose of elasticity.

Wings G each have one side fast on reinforcement wire 18, and two of their sides secured to wing arms H, and may be made of flexible material, cut wider at their rear edges so that when depressed they will have a tendency to form a scoop and to evade the air by falling in their arms when moved upward, but they may also be made of rigid material of shape similar to that of the flexible wing while it is compressing the air in its descent.

Bevel gear and crank shafts 6, which are journaled at both ends in hollow main shaft 5, are provided at their outer ends with crank arms 7 which connect by rods 8 to crank arms 9 of lower crank arm shafts 10, which are connected by crank arms 11 to eccentric rods 12 of eccentric discs 13 and 21.

The rotation and oscillation of wing arms H are controlled and operated as follows:—

The motors 2 transmit power to main shaft 5 of the wing wheel V—5—V, to which they are connected by sprocket and chain drive 4—C—14, double diameter sprocket on 5 for high speed motors, turning the wing wheel, composed of shaft 5 and its two crosses of radial arms V, and eccentric discs 13 and 21 in a direction from above-forward.

The rotation of eccentric discs 13 and 21 cause oscillation of lower crank arm shafts 10 to which they are connected by eccentric rods 12 and crank arms 11, and then of bevel gear and crank shafts 6, to which 10 are connected by crank arms 9 and 7 and rods 8, and finally of wing arm shafts 16 and 17 and 19 and 20 to which 6 are connected by common like bevel gear and rod drives 15 which each is provided with a nearly centrally located bevel gear the teeth of which engage those of like bevel gear on shafts 6, and, besides, with bevel gears at both ends the teeth of which engage those of like bevel gears fast on the adjoining ends of diametrically opposite located wing arm shafts 16 and 17 and 19 and 20.

By this arrangement the diametrically opposite located wing arm shafts 16 and 17 are forced to oscillate in opposite directions relative to each other at all times, like wing arm shafts 19 and 20, and wing arms H, fast on said wing arm shafts, are forced to oscillate in the opposite direction to that of the wing wheel V—5—V during their downward movement, but in the same direction in their ascent, or to rotate and oscillate in a manner similar to that of the wings of a bird in flight, thus causing the wings to compress the air on the downward movement and by reason of their flexibility, elasticity as well as the looseness of their rear edges or by reason of their oscillation only, in rigid wings, to evade the air on the upward movement.

Steering in the horizontal plane is attained by operation of rudders placed at the rear of car or fuselage, not shown on drawing, in such positions as will enable them to catch the air currents thrown by the descending wings.

Steering in the vertical plane may be accomplished by the increase or decrease in the speed of the motors, as well as by rudders in the lighter machines.

What I claim is:—

1. A flying machine comprising a body, a rigid wing wheel mounted therein and rotatable in the vertical plane, said wing wheel comprising a hollow central shaft with hollow radial arms rigidly affixed thereto, parallel shafts oscillatably mounted between each pair of said radial arms, flexible wings with taut or stiff front edges and loose rear edges mounted on and between wing arms rigidly affixed to said shafts, means for rotating the said wing wheel, means for oscillating the said wing arms in such manner that their oscillation is in a direction from above-forward in the upper, but from above-backward in the lower semicircle of their rotation.

2. A flying machine, comprising a body, a rigid wing wheel mounted therein and rotatable in the vertical plane, said wing wheel comprising a central hollow shaft with radial arms rigidly affixed thereto, parallel shafts oscillatably mounted between said radial arms, shovel like sheet metal wings mounted on and between wing arms rigidly affixed to said shafts, means for rotating the said wing wheel, means for oscillating the said wing arms in such manner that their oscillation is in a direction from above-forward in the upper, but from above-backward in the lower semicircle of their rotation.

3. A flying machine comprising a body, a rigid and in the vertical plane rotatable wing wheel mounted therein, said wing wheel comprising a hollow central shaft with radial arms rigidly affixed thereto, parallel shafts oscillatably mounted between said radial arms, shovel like metal wings rigidly affixed to said shafts, means for rotating the said wing wheel, means for oscillating the said wings in such manner that their oscillation is in a direction from above-forward in the upper, but from above-backward in the lower semicircle of their rotation.

Signed at New York city, in the county of Bronx and State of New York this 14th day of April A. D. 1928.

GUSTAF HEDÉN.